United States Patent Office.

JOHN A. BASSETT, OF SALEM, MASSACHUSETTS.

Letters Patent No. 64,831, dated May 21, 1867.

IMPROVED LIQUID FOR CARBURETTING GASES.

The Schedule referred to in these Letters Patent and making part of the same.

TO ALL WHOM IT MAY CONCERN:

Be it known that I, JOHN A. BASSETT, of Salem, in the county of Essex, and State of Massachusetts, have invented a new and useful Improvement in Hydrocarbon Fluid for Carburetting Gases; and I do hereby declare that the following is a full, clear, and exact description of the same.

The object of this invention is to provide a hydrocarbon liquid to be used in enriching gases used for illuminating purposes, that shall possess the advantage of volatilizing uniformly with the volume of gas and contain the proper proportion of carbon, so that it shall not pass off too rapidly.

It is well known that the light hydrocarbons of petroleum, when used alone for this purpose, vaporize and pass off too quickly, and that the light produced by their mixture with illuminating gas does not produce the best photometric results.

In this invention the light hydrocarbons of petroleum are combined with the light hydrocarbons of resin. The first products of the distillation of resin when used alone for this purpose do not volatilize freely, and practically are not of any use for this purpose. But combined in the right proportion, their action upon the light hydrocarbons of petroleum is very important. The specific gravity of the petroleum is reduced; the relative proportion of carbon in the compound is increased; the light produced has a greater photometric value, and its vaporization is fully under control. For this purpose any of the light hydrocarbons from the distillation of wood may be used, or from shale and peat. Those existing in the greatest abundance may be derived from resin; and I use for this purpose practically the first product of the distillation of resin, which has a specific gravity of about 40°. I combine this hydrocarbon with the light products of petroleum in such proportions as may be required to produce the best results. Take ninety parts of light products of petroleum, specific gravity 70° to 80°, and combine it with ten parts light products of resin, specific gravity 30° to 40°. To accomplish the most perfect result, this mixture should be distilled. There will be left in the still about five per cent. of residue. The product of the distillation will all volatilize; but if used without being so treated, a small proportion will be left in the carburettor or apparatus used for enriching the gas. If the petroleum hydrocarbon used has a higher specific gravity more of the resin products will be required; and the proportion may be varied to meet the conditions of gravity, or of the varying temperatures to which it may be exposed. The offensive odor of the petroleum is very much modified by this mixture. Any of the resins or gum resins, rich in carbon, may be used for this purpose.

Having thus fully explained the nature of my invention, what I claim therein as new, and desire to secure by Letters Patent, is—

The hydrocarbon liquid for carburetting gases, produced by the combination and process described substantially in the foregoing specification.

J. A. BASSETT.

Witnesses:
J. MILTON SANDERS,
H. L. STUART.